March 31, 1931. W. A. CHRYST ET AL 1,798,726
IGNITION APPARATUS
Filed Dec. 3, 1928   2 Sheets-Sheet 2

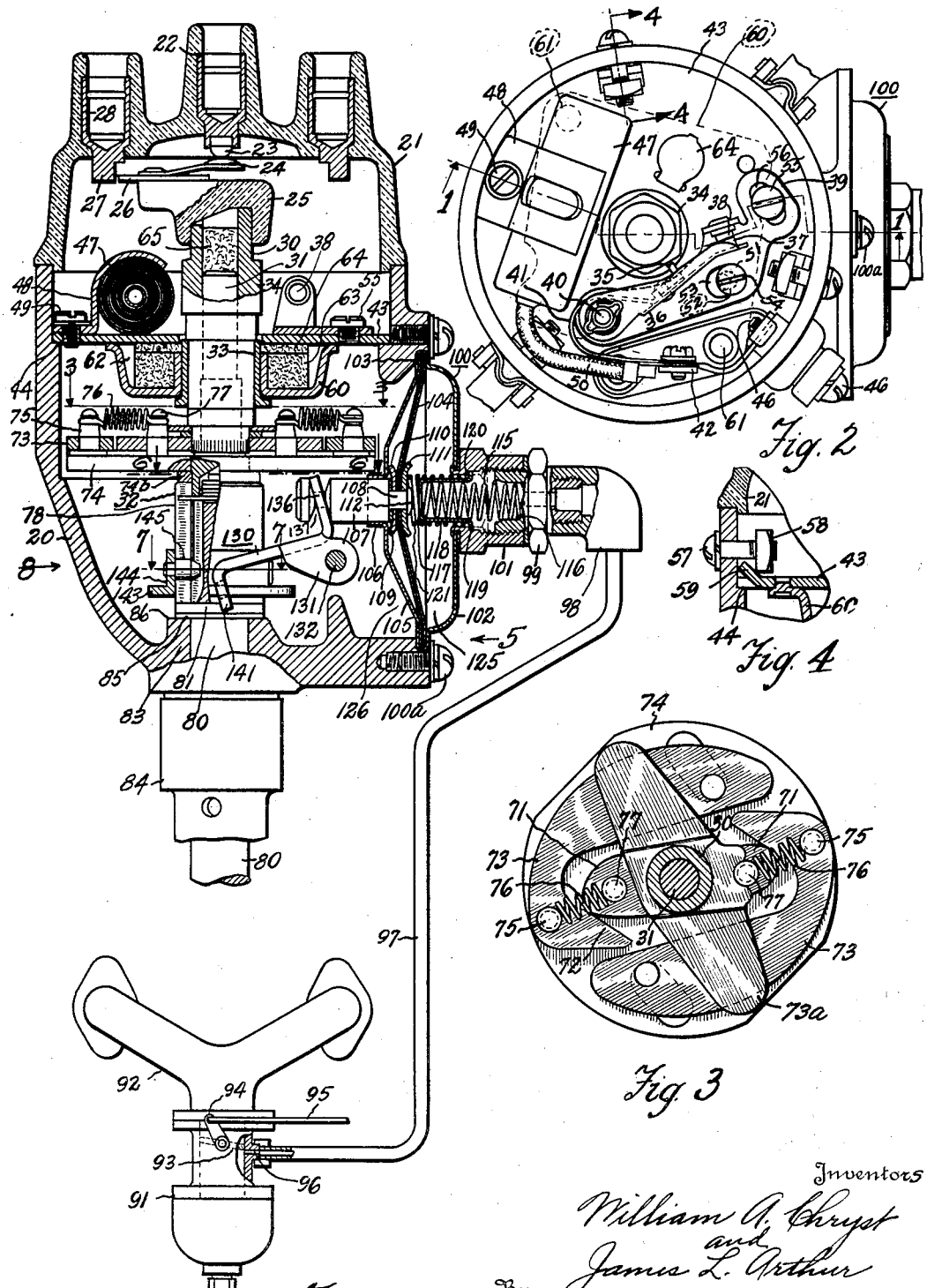

Inventors
William A. Chryst
and
James L. Arthur
By Spencer Hardman & Fehr
their Attorneys Patented Mar. 31, 1931

1,798,726

UNITED STATES PATENT OFFICE

WILLIAM A. CHRYST, OF DAYTON, OHIO, AND JAMES L. ARTHUR, OF ANDERSON, INDIANA, ASSIGNORS TO DELCO-REMY CORPORATION, OF DAYTON, OHIO, A CORPORATION OF DELAWARE

IGNITION APPARATUS

Application filed December 3, 1928. Serial No. 323,328.

This invention relates to ignition apparatus for internal combustion engines and more particularly to the control of ignition timing in response to variations in engine load and engine speed conditions.

It is one of the objects of the present invention to provide certain improvements in engine suction controlled ignition timers shown, for example, in Patent No. 1,733,941 of William A. Chryst, patented October 29, 1929. This patent discloses a circuit interrupter operated by a rotary cam, a main drive shaft, and devices respectively responsive to engine speed and engine intake suction for connecting the main drive shaft with the timer cam and for varying the angular relation between the cam and shaft.

More particularly, it is an object of the present invention to simplify the construction of an ignition timer of this type by providing a bearing for the timer shaft which is entirely independent of the timer drive shaft and by so constructing and arranging the speed and suction responsive devices that the timer cam bearing need not be in absolute alignment with the drive shaft bearing.

A further object is to provide a construction whereby the apparatus may be easily assembled or disassembled. The disclosed embodiment of the present invention provides a sub-assembly comprising the timer cam, cam bearing and speed responsive device for connecting the cam with the drive shaft. This unit may be removed from the ignition timer housing without first removing the suction responsive device which connects the timer cam with the engine shaft.

A further object of the present invention is to provide an automatic control for ignition timing which will automatically adjust the timing to a lesser degree of spark advance under no load and low speed conditions than for full load low speed conditions. In the present invention the centrifugal control is constructed to adjust the timing of the spark for variations in speed under substantially full load conditions. As some engines may idle better with the spark timing advanced to a degree less than the minimum advance effected by the centrifugal control, the spark control responsive to engine suction is constructed to adjust the timing from engine idling or no load low speed condition to full load low speed condition.

Further objects and advantages of the present invention will be apparent from the following description, reference being had to the accompanying drawings, wherein a preferred form of embodiment of the present invention is clearly shown.

In the drawings:

Fig. 1 is in part a vertical sectional view of an ignition timer embodying the present invention and in part a diagram showing the manner of connecting the suction chamber of the ignition timer with the engine intake passage.

Fig. 2 is a plan view of the timer with the distributor head removed.

Fig. 3 is a sectional view on the line 3—3 of Fig. 1 and shows the speed responsive mechanism.

Fig. 4 is a fragmentary sectional view on the line 4—4 of Fig. 2.

Figure 5:
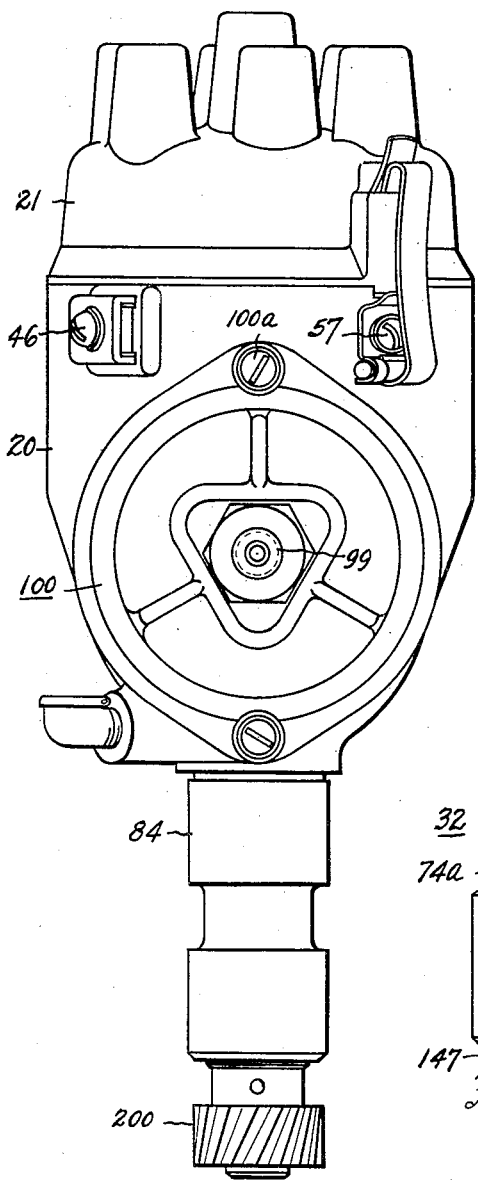
Fig. 5 is a side view of the ignition timer looking in the direction of the arrow 5 in Fig. 1.

In the drawings, 20 designates the housing of the timer which supports a conventional distributor head 21 carrying a center terminal socket 22 having a contact 23 for engaging a contact 24 supported by a rotor block 25 carrying a distributor segment 26 electrically connected with the contact 24 and rotated adjacent to a plurality of distributor posts 27 which are arranged in a circular row. Each post is integral with a socket 28 for receiving a plug or terminal connector (not shown) attached to a wire leading to an engine spark plug.

The rotor block 25 is supported by and driven by a cam carrying shaft 30 which rotates loosely about an extension 31 of an intermediate driving shaft 32 and which is journalled in a bearing 33 secured to a bearing bracket 60 which is attached to a supporting plate 43 resting upon an annular ledge 44 provided by the housing 20. The shaft 30 is provided with a cam 34 which operates with a rubbing block 35 of a circuit breaker lever 36 carrying a contact 37 adapted to engage a stationary contact 38 supported by contact bracket 39 which is adjustable about the pivot stud 40 of the lever 36. A leaf spring 41 conducts current from a terminal bracket 42 to the lever 36 and urges the contact 37 toward the contact 38 and the rubbing block 35 toward the cam 34. The pivot post 40 is attached to the plate 43. The terminal bracket 42 is insulatingly supported by the plate 43 and is connected with a terminal screw 46 which is insulated from the housing.

A condenser which is contained within a case 47 is attached by clip 48 and screw 49 to the plate 43. One of the condenser foils is electrically connected with the condenser case 47 and hence with the plate 43, and the other foil is connected with the terminal bracket 42 by a conductor 50.

The stationary contact bracket 39 is adjusted by turning a stud 51 having an eccentric shank 52 by which the stud is pivotally connected with the plate 43. The head of the stud 51 is received by a slot 53 in the bracket 39 and is provided with a screw driver receiving slot 54 by which the stud 51 may be turned in order to adjust the bracket 39 angularly about its pivot 40. The bracket 39 is secured to the plate 43 in adjusted position by a screw 55 passing through a slot 56 in the bracket 39 and having threaded engagement with the plate 43.

The plate 43 is secured upon the annular shoulder 44 provided by the housing 20 by screws 57 and nuts 58 each of which is adapted to engage a lug 59 provided by the plate 43, as shown in Figs. 2 and 4.

The bracket 60 for the bearing 33 is attached by rivets 61 to the plate 43 and provides an annular chamber 62 for receiving a thick felt ring 63 and a thinner felt washer 64 having its inner edge in contact with the bearing 33 which is constructed of a porous metallic structure capable of absorbing lubricant from the felt washer 64 and giving it out as needed to the journal of the cam carrying shaft 30. The lubricant is supplied through an oil cup to the reservoir 62 and to the felt members 63 and 64 therein.

The upper tubular end of the tubular cam carrying shaft 30 receives a cylindrical felt pad 65 for receiving lubricant which is given out as needed to the upper extension 31 of the intermediate shaft 32, in order that relative movement may take place between the parts 30 and 31 with the minimum friction.

The lower end of the cam carrying shaft 30 rests upon a shoulder 70 provided by the shaft 32 and is attached to a plate providing lever arms 71, each of which is adapted to cooperate with an arm 72 of a weight 73. Each weight 73 is supported by weight plate 74 and swings around a stud 75 attached to the plate 74. A spring 76 connects a stud 77 carried by an arm 71 with one of the studs 75 and in this way tends to move the weight 73 toward the shaft 30. The plate 74 is drive-fitted over the knurled part 74a of the intermediate shaft 32 which is provided with a tubular lower end 78 which is journalled loosely upon the journal portion 79 of the timer drive shaft 80 and which rests at its lower end upon a collar 81 which is provided by swedging a washer into a shallow annular groove 82 provided by the shaft 80. Part 74b is a spacer between the bottom of plate 74 and the tubular end 78. The shaft 80 is journalled in a bearing 83 provided by the shank 84 of the timer housing 20 and its downward movement is limited due to the collar 81 engaging a thrust washer 85 resting upon the upper end of a boss 86 provided by the housing 20. The lower end of the shaft 80 carries a gear 200 (see Fig. 5) adapted to mesh with a gear driven by the engine so that the timer cam may be driven in a definite timed relation thereto.

The intermediate shaft 32 is drivingly connected with the drive shaft 80 by means responsive to variations in suction in the intake passage of the engine. The intake passage is represented diagrammatically by a carburetor 91 and an intake manifold 92. The throttle 93 of the carburetor 91 is operated by a lever 94 and a rod 95. The carburetor is provided with a passage 96 which is anterior to the throttle when closed and which is on the engine side of the throttle when the throttle is opened a certain amount beyond idling position. The passage 96 is connected by a pipe 97, an elbow 98, and a coupling 99 with a unitary structure designated in its entirety by numeral 100 and attached to housing 20 by screws 100a. The structure 100 comprises a tubular bushing 101 connected to a cover plate 102 having its U-shaped flange 103 fitting tightly around the peripheries of superposed flexible diaphragm members 104 and a plate 105 providing a tubular guide 106 for a movable rod 107. The rod 107 has a shank 108 of reduced diameter passing through a washer 109, a washer 110 having its periphery flanged toward the rod 107, through the two diaphragm members 104 and then through a washer 111 having its periphery flanged away from the rod 107. The shank 108 is riveted over at 112 to secure the rod 107 to the washers and diaphragm members 104. The tubular bushing 101 provides an enclosure for a relatively stiff spring 115 bearing at one end against a shoulder 116 provided by the coupling 99, and at the other end against the inwardly turned annular flange 117 provided by a spring guide tube 118. Movement of the guide tube 118 toward the left relative to the bushing 101 is limited due to the fact that tube 118 is provided with an outwardly turned annular flange 119, which engages an annular shoulder 120 provided on the interior of the bushing 101. Thus the spring 115 normally holds the spring guide tube 118 in the position shown in Fig. 1. Between the washer 111 and the outwardly turned flange 119 of the spring guide tube 118, there is located a relatively weak spring 121. The spring 121 operates to maintain the diaphragm member 104 and hence the rod 107 in the position shown in Fig. 1. Thus it will be seen that the unitary structure 100 provides a suction chamber 125 in communication with the engine intake and also provides a closure for an opening 126 in one side of the timer housing 20. It will be apparent that the relatively slight reduction of pressure within the suction chamber 125 will overcome the relatively weak spring 121 permitting the diaphragm 104 to move toward the right until the shank 108 of the rod 107 engages the spring tube 118. Thereafter movement of the diaphragm 104 toward the right will be resisted by the spring 115; hence, a greater reduction in pressure within the suction chamber 125 must occur before the spring 115 will be overcome. The reason for opposing movements of the diaphragm 104 toward the right as suction increases by first a light spring and then a stronger spring will be explained in detail later. In order that the rod 107 may move readily in either direction in response to variations in suction in the chamber 125, the diaphragms are constructed preferably of air tight cloth rather than metal. Air tight cloth is preferable to metal since it will withstand many deflections before breaking and will permit of greater oscillatory movements of the central portion, than will a metal diaphragm of the same diameter. One kind of cloth which is suitable for this purpose is varnished airplane linen.

The actuating rod 107 is articulated with a bell crank lever 130 having ears 131 pivoted upon a rod 132 which extends between opposite walls 133 and 134 of the housing 120 and has one end threaded into the wall 134 and the other end provided with a screw driver receiving slot 135 by which the rod 132 is screwed into the wall 134. The bell crank lever 130 is provided with notched angular extension 136 received by a groove 137 in the rod 107, the notch of the part 136 receiving the portion of reduced diameter of the rod 107 defining the bottom of the groove 137. The bell crank lever 130 provides arms 140 encircling the intermediate shaft extension 78, and each arm 140 is provided with an angular extension 141 having a notch 142 which receives the outwardly extending annular flange 143 of a collar 144, which is slidable along the intermediate shaft extension 78. The collar 144 supports diametrically opposite studs 145. Each stud 145 has a cylindrical portion 146 received by one of two diametrically opposite, longitudinal slots 147 provided by the intermediate shaft extension 78. Each stud 145 is provided with a conical end 148, which is received by one of two diametrically opposite, oblique grooves 149 provided in the extension 150 of the shaft 80.

Figure 6:
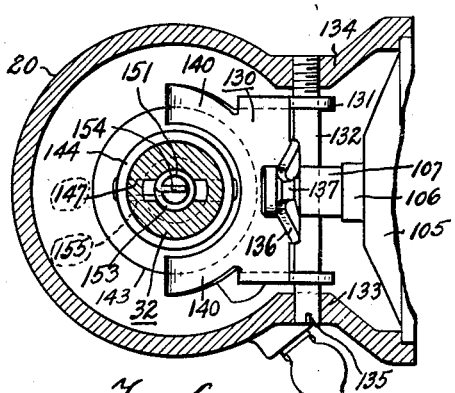
Fig. 6 is a fragmentary sectional view on the line 6—6 of Fig. 1.
Figure 7:
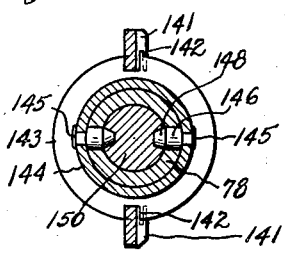
Fig. 7 is a fragmentary sectional view on the line 7—7 of Fig. 1.
Figure 8:
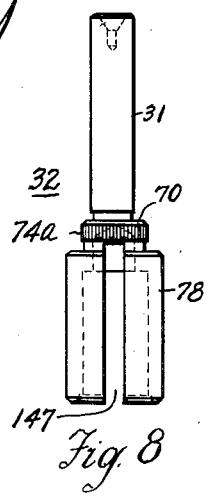
Figs. 8 and 9 are side and bottom views respectively of an intermediate shaft included in the driving connection between the timer drive shaft and the timer cam, Fig. 8 being viewed in the direction of the arrow 8 of Fig. 1.
Figure 11:
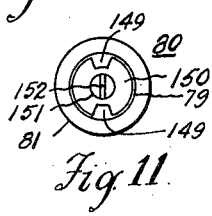
Figs. 10 and 11 are fragmentary side and top views, respectively, of a portion of the upper end of the timer drive shaft.
Figure 10:
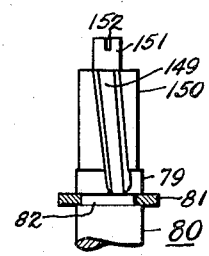
Figure 9:
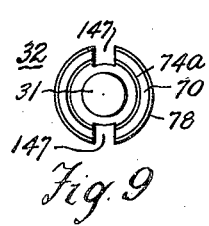

As shown in Fig. 10, the shaft 80 carries an extension 151 having a transverse notch 152. As shown in Fig. 6, the extension 151 is surrounded by a coil spring 153, one end 154 of which is received by the notch 152, and the other end 155 extends through one of the grooves 147 of the intermediate shaft extension 78. The spring 153 is biased so as to tend to urge the shaft extension 78 in a counterclockwise direction with respect to the shaft extension 151, as viewed in Fig. 6. The function of this spring is to assist in restoring to normal the relation between the intermediate shaft 32 and the drive shaft 80. As the collar 144 moves upwardly from normal position shown in Fig. 1, the shaft 32 will rotate in a clockwise direction relative to the shaft 80, as viewed in Fig. 6. This relative rotative movement is resisted by spring 153. When the collar 144 moves downwardly the shaft 32 tends to rotate counterclockwise relative to shaft 80, and this movement is assisted by the spring 153.

Mode of operation

The timer unit is operated by rotating the shaft 80 which is driven by the engine. Motion is transmitted from the shaft 80 to the intermediate shaft 32 through the studs 145, and from the shaft 32 to the cam shaft 30 through the coacting weights 73 and lever arms 71 of the speed responsive mechanism. This mechanism is so constructed that absolute alignment of the shafts 30 and 80 is not required, hence it is possible to provide a bearing for the shaft 30 which is entirely independent of any support provided by the shaft 80. As the speed rotation of the shaft 80 increases the weights 73 move about their pivots 75 away from the shaft 30 and coact with the lever arms 71 attached to the shaft 30 so as to cause the shaft 30 to rotate clockwise relative to the weight plate 74. The direction of rotation of the cam 34 being clockwise as viewed in Fig. 2, the timing of the spark will be advanced with increasing speed. The engaging surfaces of the weight lever arms 72 and the cam shaft lever arms 71 are so shaped and the spring 76 is so constructed and located that the spark timing will be controlled automatically in response to speed variations to give best engine performance for full load conditions with wide open throttle.

A weight guard plate 73a, carried by shaft 30, extends over the weights 73 and limits their sidewise movements axially of their pivot studs 75, so that the weights 73 cannot move beyond the plane of the lever arms 71.

It is well known that an internal combustion engine may be operated more efficiently at part load if its spark advance is greater than when operating at full load at the same speed. Therefore, the suction responsive mechanism operates to increase the angle of advance between the shaft 30 and the shaft 80 over and above the angle of advance produced by the speed responsive mechanism. At a given speed, as the carburetor butterfly valve is moved from wide open to partly closed position the suction on the engine side of the throttle will increase. When the suction in the intake 92 increases there will be corresponding increase in suction in the chamber 125 causing the diaphragm 104 to move toward the right in opposition to the resistance of springs 115 and 121 and causing the bell crank lever 130 to move clockwise and the collar 144 to move upwardly to advance the intermediate shaft 32 relative to the shaft 80. Conversely, as the throttle valve is opened wider, the suction in the intake 92 will decrease and there will be a corresponding decrease in suction in the chamber 135 permitting the springs 115 and 121 to move the diaphragm 104 into a balanced position thereby causing the bell crank lever 30 to move counterclockwise and the collar 144 to move downwardly in order to retard the shaft 32 relative to the shaft 80.

As explained before, movement of the diaphragm 104 toward the right with increasing suction is opposed first by the weak spring 101 before resistance is offered by the stiffer spring 115. This construction permits idling the engine at a spark advance which is less than that required by the engine when operating at minimum speed and full load. For example, it may be found that for best engine performance at minimum speed and full load the spark timing should be 12½° on the flywheel ahead of dead center. In order that the centrifugal control might take care of the spark timing for full load conditions, the centrifugal control must operate within a range beginning at 12½°. It may be also found that this same engine idles best when the spark timing is 7½° ahead of dead center or less. In the present invention use is made of the suction control for making the change from a no load low speed condition, requiring a 7½° spark position, to a full load low speed condition requiring 12½°. Fig. 1 shows diagrammatically that when the throttle valve 93 is in engine idling position, the port 96 is below the edge of the throttle valve and hence not in communication with the suction of the intake 92. If the throttle 93 is moved to wide open position, even before a change in speed takes place, there will be sufficient suction in the chamber 125 to overcome the spring 121 and to permit the diaphragm 104 to move toward the right until the shank 108 of the rod 107 engages the spring guide 118. This movement of the rod 107 will be sufficient to advance the spark the required amount for low speed full load operating conditions —5° in the example given.

The apparatus may be readily disassembled for repairs or replacements. After disconnecting the suction line 97 from the suction chamber unit 100 and after removing the screws 132 and 100a, the suction chamber unit 100 and the bell crank lever 130 may be removed through the opening 126. After removing the screws 57, which hold down the interrupter supporting plate 43, and after removing the gear 200 which is attached to the lower end of the shaft 80, all of the rotating parts of the mechanism together with the plate 43 and parts supported thereby may be removed from the ignition timer housing while remaining assembled. It is obvious, therefore, that this construction permits assembling the apparatus by first assembling a number of sub-assemblies. These sub-assemblies are chiefly, the interrupter sub-assembly including the plate 43 and interrupter parts supported thereon, the shaft bearing 33 and the shaft 30 carrying at its lower end the lever arms 71; the intermediate shaft sub-assembly, comprising the intermediate shaft 32, weight plate 74, weights 73 and springs 76 attached to the studs 75; and the suction chamber sub-assembly 100.

The apparatus is assembled in the following order: shaft 80 is moved through the washer 85 and then through the bearing 83 until the shaft shoulder 81 rests upon the washer 85 and the latter upon the boss 86. The collar 144 is placed around the extension 150 of the shaft 80 with its studs 145 entering the oblique groove 149. The spring 153 is next placed upon the shaft extension 151, one end of the spring being placed in the notch 152. The interrupter and cam shaft sub-assembly is placed upon the intermediate shaft sub-assembly, the shaft 30 being moved over the intermediate shaft extension 31. The springs 76 are then attached to the spring studs 77 on the lever arms 71. The intermediate shaft is attached over the shaft 80 until the lower end of the sleeve 78 rests upon the collar 81 of the shaft 80. During this assembling operation the notches 147 will receive the stud 145 of the collar 144, and one of the notches 147 will receive the end 155 of the spring 153. Then the lever 130, rod 132 and suction chamber sub-assembly 100 are attached.

While the form of embodiment of the present invention as herein disclosed, constitutes a preferred form, it is to be understood that other forms might be adopted, all coming within the scope of the claims which follow.

What is claimed is as follows:

1. Ignition apparatus for internal combustion engines comprising, in combination, an interrupter, a cam for operating the interrupter, a cam-carrying shaft, a drive shaft, an intermediate shaft having a tubular part surrounding the drive shaft and cylindrical portion extending into the cam-carrying shaft, speed responsive mechanism for connecting the intermediate shaft with the cam-carrying shaft, a part extending into grooves provided respectively in the intermediate shaft and in the drive shaft, at least one of said grooves being oblique, and suction responsive means for moving said part along the shaft.

2. Ignition apparatus for internal combustion engines comprising, in combination, an interrupter, a cam for operating the interrupter, a cam-carrying shaft, a drive shaft, spaced bearings each independently supporting one of the shafts, an intermediate shaft rotatably supported by at least one of the first mentioned shafts, speed responsive means for connecting the intermediate shaft with one of the two first mentioned shafts and for varying the angular relation between them, and engine suction responsive means for connecting the intermediate shaft with the other one of the two first mentioned shafts and for varying the angular relation between them.

3. Ignition apparatus for internal combustion engines comprising, in combination, an interrupter, a cam for operating the interrupter, a cam-carrying shaft, a drive shaft, spaced bearings each independently supporting one of the shafts, an intermediate shaft rotatably supported by at least one of said shafts, speed responsive means for connecting the intermediate shaft with the cam shaft and for varying the angular relation between them, and engine suction responsive means for connecting the intermediate shaft with the drive shaft and for varying the angular relation between them.

4. Ignition apparatus for internal combustion engines comprising, in combination, an interrupter having an operating cam, a drive shaft, a second shaft connected with the cam, one of said shafts having a portion within the other, a collar movable along said shafts, a pin carried by the collar and extending into grooves in said shafts, at least one of the grooves being oblique, means for moving the collar along the shafts to vary the angular relation between them, and a spring mounted on one of the shafts and constructed and arranged to resist relative angular movement between the shafts when the collar is moved in a certain direction along the shafts.

5. Ignition apparatus for internal combustion engines comprising, in combination, an interrupter, and means responsive to engine suction for varying the time relation between the engine cycle and the interrupter cycle, said means including a flexible diaphragm forming one wall of a suction chamber and a plurality of springs successively resisting the motion of the diaphragm in one direction.

6. Ignition apparatus for internal combustion engines comprising, in combination, an interrupter, and means responsive to engine suction for varying the time relation between the engine cycle and the interrupter cycle, said means including a flexible diaphragm forming one wall of a suction chamber and a relatively weak spring operating alone to resist movement of the diaphragm during a certain portion of its movement in one direction, and a relatively strong spring operating to resist motion of the diaphragm during further movement thereof.

7. Ignition apparatus for internal combustion engines comprising, in combination, an interrupter, and means responsive to engine suction for varying the time relation between the engine cycle and the interrupter cycle, said means including a flexible diaphragm forming one wall of a suction chamber and a relatively weak spring at all times resisting motion of the diaphragm in one direction, and a relatively strong spring resisting motion of the diaphragm during a certain portion of its movement.

8. Ignition apparatus for internal combustion engines comprising, in combination, an interrupter, and means responsive to engine suction for varying the time relation between the engine cycle and the interrupter cycle, said means including a flexible diaphragm forming one wall of a suction chamber and a relatively stiff spring for resisting movement of the diaphragm during a portion of its movement in response to increase in engine suction, means for confining said spring in a state of initial compression and comprising a stationary stop and a relatively movable stop, a second stationary stop limiting movement of the movable stop toward the diaphragm and a relatively light spring located between the diaphragm and relatively movable stop and operative normally to hold the diaphragm out of engagement with the relatively movable stop.

9. Ignition apparatus for internal combustion engines comprising, in combination, an interrupter, and means responsive to engine suction for varying the time relation between the engine cycle and the interrupter cycle, said means including a flexible diaphragm forming one wall of a suction chamber, a relatively stiff spring for resisting movement of the diaphragm during a portion of its movement in response to increase in engine suction, means for confining said spring in a state of initial compression and comprising a stationary stop engaging one end of the spring and provided by a tubular member communicating with the suction chamber and comprising a movable tube receiving the other end of said spring, said tube having a flange located intermediate the ends of said spring, and comprising a second stationary stop engageable with said flange of the tube for limiting motion of the tube toward the diaphragm, and a relatively weak spring surrounding said tube and located between said flange and said diaphragm and operating normally to hold the diaphragm away from the tube.

In testimony whereof we hereto affix our signatures.

WILLIAM A. CHRYST.
JAMES L. ARTHUR.